US011868700B2

(12) United States Patent
Inumpudi et al.

(10) Patent No.: US 11,868,700 B2
(45) Date of Patent: Jan. 9, 2024

(54) USE OF ADAPTIVE REPLACEMENT MAPS IN DIGITAL LITHOGRAPHY FOR LOCAL CELL REPLACEMENT

(71) Applicant: Applied Materials, Inc., Santa Clara, CA (US)

(72) Inventors: Aravind Inumpudi, Fremont, CA (US); Thomas L. Laidig, Richmond, CA (US)

(73) Assignee: Applied Materials Inc., Santa Clara, CA (US)

( * ) Notice: Subject to any disclaimer, the term of this patent is extended or adjusted under 35 U.S.C. 154(b) by 112 days.

(21) Appl. No.: 17/457,195

(22) Filed: Dec. 1, 2021

(65) Prior Publication Data

US 2023/0169253 A1     Jun. 1, 2023

Related U.S. Application Data

(63) Continuation of application No. PCT/US2020/065579, filed on Dec. 17, 2020.

(51) Int. Cl.
*G06F 30/30* (2020.01)
*G03F 1/72* (2012.01)
*G06F 30/398* (2020.01)
*G06F 119/18* (2020.01)

(52) U.S. Cl.
CPC .............. *G06F 30/398* (2020.01); *G03F 1/72* (2013.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 8,082,525 | B2 * | 12/2011 | Liu ..................... | G03F 7/70291 700/121 |
| 11,487,209 | B2 * | 11/2022 | Staals ................. | G03F 7/70616 |
| 2003/0154461 | A1 * | 8/2003 | Pierrat ................ | G03F 1/36 430/5 |
| 2005/0084766 | A1 * | 4/2005 | Sandstrom ......... | G03F 7/70291 430/311 |
| 2012/0102441 | A1 * | 4/2012 | Aton .................. | G03F 1/36 716/54 |
| 2015/0020037 | A1 * | 1/2015 | Fujimura ............ | G06F 30/20 716/51 |
| 2017/0053058 | A1 * | 2/2017 | Yu ...................... | G06F 30/398 |
| 2019/0339621 | A1 * | 11/2019 | Verschuren ......... | G03F 7/70383 |
| 2020/0098545 | A1 * | 3/2020 | Chang ................ | G03F 1/36 |
| 2022/0367438 | A1 * | 11/2022 | Kang .................. | G03F 7/70433 |

* cited by examiner

*Primary Examiner* — Leigh M Garbowski
(74) *Attorney, Agent, or Firm* — Patterson + Sheridan, LLP

(57) ABSTRACT

Embodiments described herein relate to a system, software, and a method of using the system to edit a design to be printed by a lithography system. The system and methods utilize a server of a maskless lithography device. The server includes a memory. The memory includes a virtual mask file. The virtual mask file includes cells and the cells include sub-cells that form one or more polygons. The server further includes a controller coupled to the memory. The controller is configured to receive a replacement table. The replacement table includes instructions to replace the cells of the virtual mask file. The controller is further configured to replace the cells with replacement cells according to the replacement table to create an edited virtual mask file.

20 Claims, 6 Drawing Sheets

USE OF ADAPTIVE REPLACEMENT MAPS IN DIGITAL LITHOGRAPHY FOR LOCAL CELL REPLACEMENT

CROSS-REFERENCE TO RELATED APPLICATIONS

This application claims benefit of PCT patent application serial number PCT/US2020/065579, filed Dec. 17, 2020, which is hereby incorporated herein by reference.

BACKGROUND

Field

Embodiments of the present disclosure generally relate to lithography systems. More particularly, embodiments of the present disclosure relate to systems, software, and a method of using the system to edit a design to be printed by a lithography system.

Description of the Related Art

Photolithography is widely used in the manufacturing of semiconductor devices and display devices, such as liquid crystal displays (LCDs). Large area substrates are often utilized in the manufacture of LCDs. LCDs, or flat panels, are commonly used for active matrix displays, such as computers, touch panel devices, personal digital assistants (PDAs), cell phones, television monitors, and the like. Generally, flat panels may include a layer of liquid crystal material forming pixels disposed between two plates. When power from a power supply is applied across the liquid crystal material, an amount of light passing through the liquid crystal material may be controlled at pixel locations enabling images to be generated.

Lithography techniques are generally employed to create electrical features incorporated as part of the liquid crystal material layer forming the pixels. Maskless lithography techniques involve creating a virtual mask, and selected portions of films are removed from the films to create patterns in films on substrates. Maskless lithography techniques include electron beam lithography, optical lithography, direct laser writing, focused ion beam lithography, probe-tip contact lithography, and the like.

One problem in the art is that maskless lithography techniques can result in imperfections in the created pattern. The substrate can have warpage, die-shift, or other defects that will affect the subsequent layers to be patterned over the substrate. Additionally, an underlying layer can include defects that will affect a layer to be patterned over the underlying layer. The defects must be accounted for when manufacturing the patterns on the substrates.

Therefore, there is a need for a system, software, and a method of using the system to edit a design to be printed by a lithography system

SUMMARY

In one embodiment, a server for use in performing digital lithography is provided. The server includes a memory. The memory includes a virtual mask file. The virtual mask file includes cells. The cells include sub-cells that form one or more polygons. The server further includes a controller coupled to the memory. The controller is configured to receive a replacement table. The replacement table includes instructions to replace the cells of the virtual mask file. The controller is further configured to replace the cells with replacement cells according to the replacement table to create an edited virtual mask file. The server is operable to be used in performing digital lithography on a substrate based on the edited virtual mask file.

In another embodiment, a method is provided. The method includes loading a virtual mask file into a memory of a server of a maskless lithography device. The virtual mask file includes cells. The cells include sub-cells that form one or more polygons. The method further includes sending a replacement table to the server. The replacement table includes instructions to replace the cells of the virtual mask file. The method further includes replacing the cells with replacement cells according to the replacement table to create an edited virtual mask file. The edited virtual mask file is created in the server of the maskless lithography device.

In yet another embodiment, a non-transitory computer-readable medium is provided. The non-transitory computer-readable medium stores instructions that, when executed by a processor, cause a computer system to perform steps. The steps include loading a virtual mask file into a memory of a server of a maskless lithography device. The virtual mask file includes cells. The cells include sub-cells that form one or more polygons. The steps further include sending a replacement table to the server. The replacement table includes instructions to replace the cells of the virtual mask file. The steps further include replacing the cells with replacement cells according to the replacement table to create an edited virtual mask file. The edited virtual mask file is created in the server of the maskless lithography device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to lithography systems. More particularly, embodiments of the present disclosure relate to a system, and methods of using the system to edit a design to be printed by a lithography system. The method includes loading a virtual mask file into a memory of a server of a maskless lithography device. The virtual mask file includes cells. The cells include sub-cells that form one or more polygons. The method further includes sending a replacement table to the server. The replacement table includes instructions to replace the cells of the virtual mask file. The method further includes replacing the cells with replacement cells according to the replacement table to create an edited virtual mask file. The edited virtual mask file is created in the server of the maskless lithography device.

Figure 1:
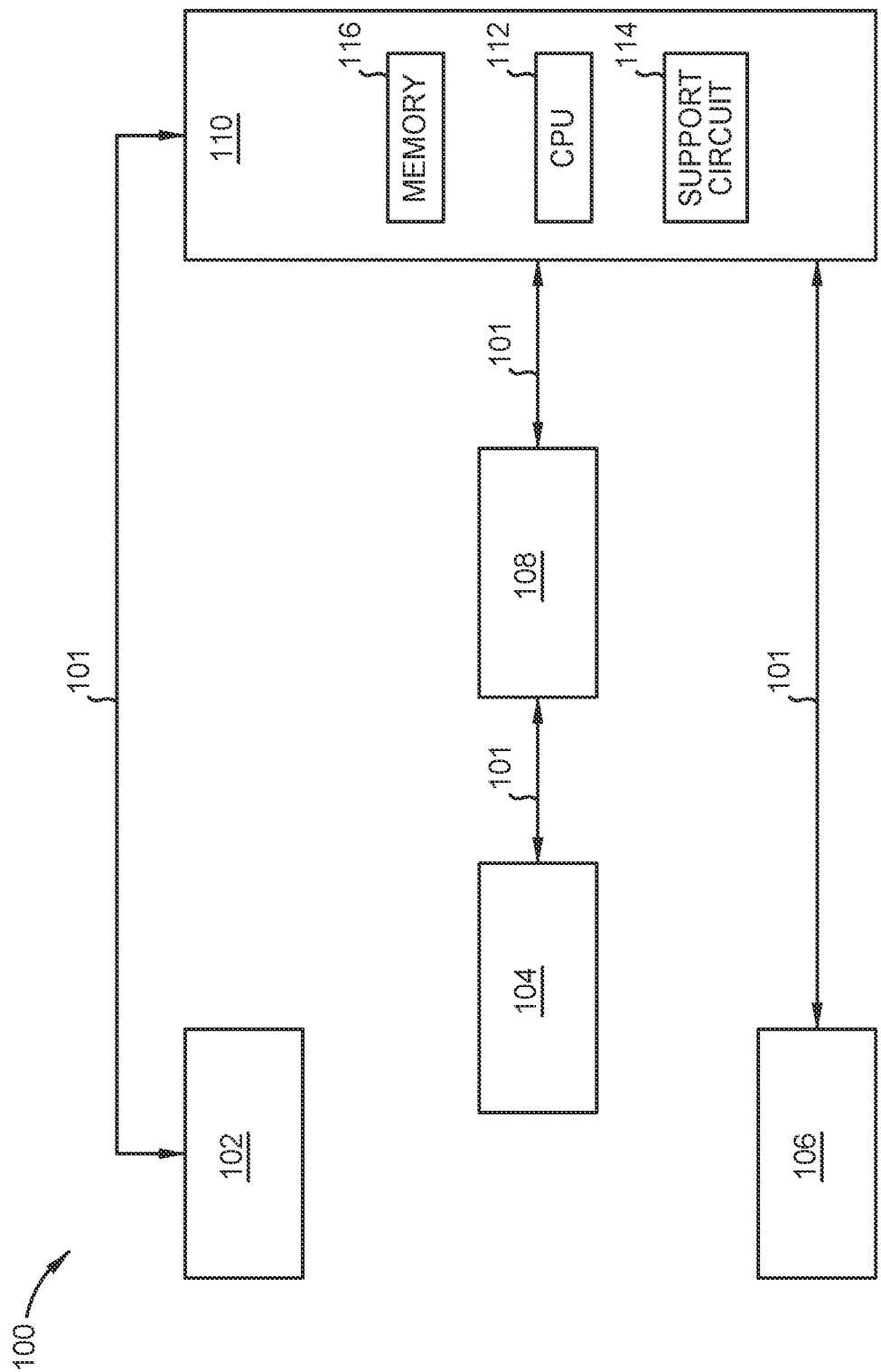
FIG. 1 is a schematic diagram of a lithography environment according to embodiments.

FIG. 1 is a schematic diagram of a lithography environment 100, according to an embodiment. As shown, the lithography environment 100 includes, but is not limited to, a virtual mask device 102, a metrology tool 104, a maskless lithography device 106, a conversion server 108, a computer-integrated manufacturing (CIM) system 110, and communication links 101. Each of the lithography environment devices is operable to be connected to each other via the communication links 101. Each of the lithography environment devices is operable to be connected to the CIM system 110 by the communication links 101. The lithography environment 100 can be located in the same area or production facility, or the each of the lithography environment devices can be located in different areas.

Each of the plurality of lithography environment devices are additionally indexed with method 500 operations described herein. Each of the virtual mask device 102, the metrology tool 104, the maskless lithography device 106, the conversion server 108, and the CIM system 110 include an on-board processor and memory, where the memory is configured to store instructions corresponding to any portion of the method 500 described below. The communication links 101 may include at least one of wired connections, wireless connections, satellite connections, and the like. The communications links 101 include sending and receiving files to store data, according to embodiments further described herein. The communications links 101 can include temporarily or permanently storing files or data in the cloud, before transferring or copying the files or data to a lithography environment device.

In one embodiment, which can be combined with other embodiments described herein, the maskless lithography device 106 and the metrology tool 104 are connected by a transfer system. The transfer system is operable to transfer a substrate between the maskless lithography device 106 and the metrology tool 104. In one embodiment, which can be combined with other embodiments described herein, the transfer system can include robots or other equipment connectable to the CIM system 110 operable to transfer patterned substrates. In one embodiment, which can be combined with other embodiments described herein, the transfer system is physically operable by the user.

The CIM system 110 includes a central processing unit (CPU) 112, support circuits 114 and a memory 116. The CPU 112 can be one of any form of computer processor that can be used in an industrial setting for controlling the lithography environment devices. The memory 116 is coupled to the CPU 112. The memory 116 can be one or more of readily available memory, such as random access memory (RAM), read only memory (ROM), floppy disk, hard disk, or any other form of digital storage, local or remote. The support circuits 114 are coupled to the CPU 112 for supporting the processor in a conventional manner. These circuits include cache, power supplies, clock circuits, input/output circuitry, subsystems, and the like. The CIM system 110 can include the CPU 112 that is coupled to input/output (I/O) devices found in the support circuits 114 and the memory 116. The CIM system 110 is operable to receive a virtual mask file and transfer the virtual mask file to the maskless lithography device 106 via the communication links 101. The CIM system 110 is operable to receive a replacement table from the conversion server 108 and transfer the replacement table to the maskless lithography device 106 via the communication links 101.

The memory 116 can include one or more software applications, such as a controlling software program. The memory 116 can also include stored media data that is used by the CPU 112 to perform the method 500 described herein. The CPU 112 can be a hardware unit or combination of hardware units capable of executing software applications and processing data. In some configurations, the CPU 112 includes a central processing unit (CPU), a digital signal processor (DSP), an application-specific integrated circuit (ASIC), and/or a combination of such units. The CPU 112 is generally configured to execute the one or more software applications and process the stored media data, which can be each included within the memory 116. The CIM system 110 controls the transfer of data and files to and from the various lithography environment devices. The memory 116 is configured to store instructions corresponding to any operation of the method 500 according to embodiments described herein.

The virtual mask device 102 is operable to receive a design file. The design file determines which tasks are to be performed on the substrates. The design file (or computer instructions), which may be referred to as an imaging design file or a graphic design system (GDS) file, is converted into the virtual mask file by the virtual mask device 102. The virtual mask file is a digital representation of the design to be printed by the maskless lithography device 106. The virtual mask file includes a mask pattern 300 (shown in FIG. 3). The virtual mask file is sent through the CIM system 110 to the maskless lithography device 106 via the communication links 101. The virtual mask file is stored in the maskless lithography device 106. In one embodiment, which can be combined with other embodiments described herein, the virtual mask file is sent directly to the maskless lithography device 106. In another embodiment, which can be combined with other embodiments described herein, the virtual mask file includes a layered file. For example, the virtual mask file can include multiple layers of the design that correspond to the multiple layers to be patterned into the photoresist.

The metrology tool 104 is operable to detect defects in the substrates. The defects on the substrates will result in a sub-optimal print. The substrate can include defects, such as warpage or die shift. Additionally, an underlying layer can include defects that will affect a layer to be patterned over the underlying layer. The layer to be patterned over the substrate or the underlying layer needs to account for these defects. The virtual mask file of the layer to be patterned can be edited in the maskless lithography device 106 to account for the defects. The defects can be caused by shifts of the underlying layer, which results in low yield of patterned substrates. In one embodiment, which can be combined with other embodiments described herein, the metrology tool 104 can detect warpage of the substrates. In another embodiment, which can be combined with other embodiments described herein, the metrology tool 104 can detect die-shift of the substrates. The metrology tool 104 is operable to detect defects in each layer patterned on the substrates. The metrology tool 104 is further operable to detect defects in a non-patterned substrate.

The metrology tool 104 is in communication with the conversion server 108 via the communication links 101. The metrology tool 104 sends a defect list to the conversion server 108 after detection of the defects. The defect list includes the locations of the defects on the substrates. In one embodiment, which can be combined with other embodiments described herein, the conversion server 108 can run a conversion script to convert the defect list to a replacement table. The conversion script creates the replacement table which includes the desired edits to the virtual mask based on the defects detected on the substrates.

Figure 2:
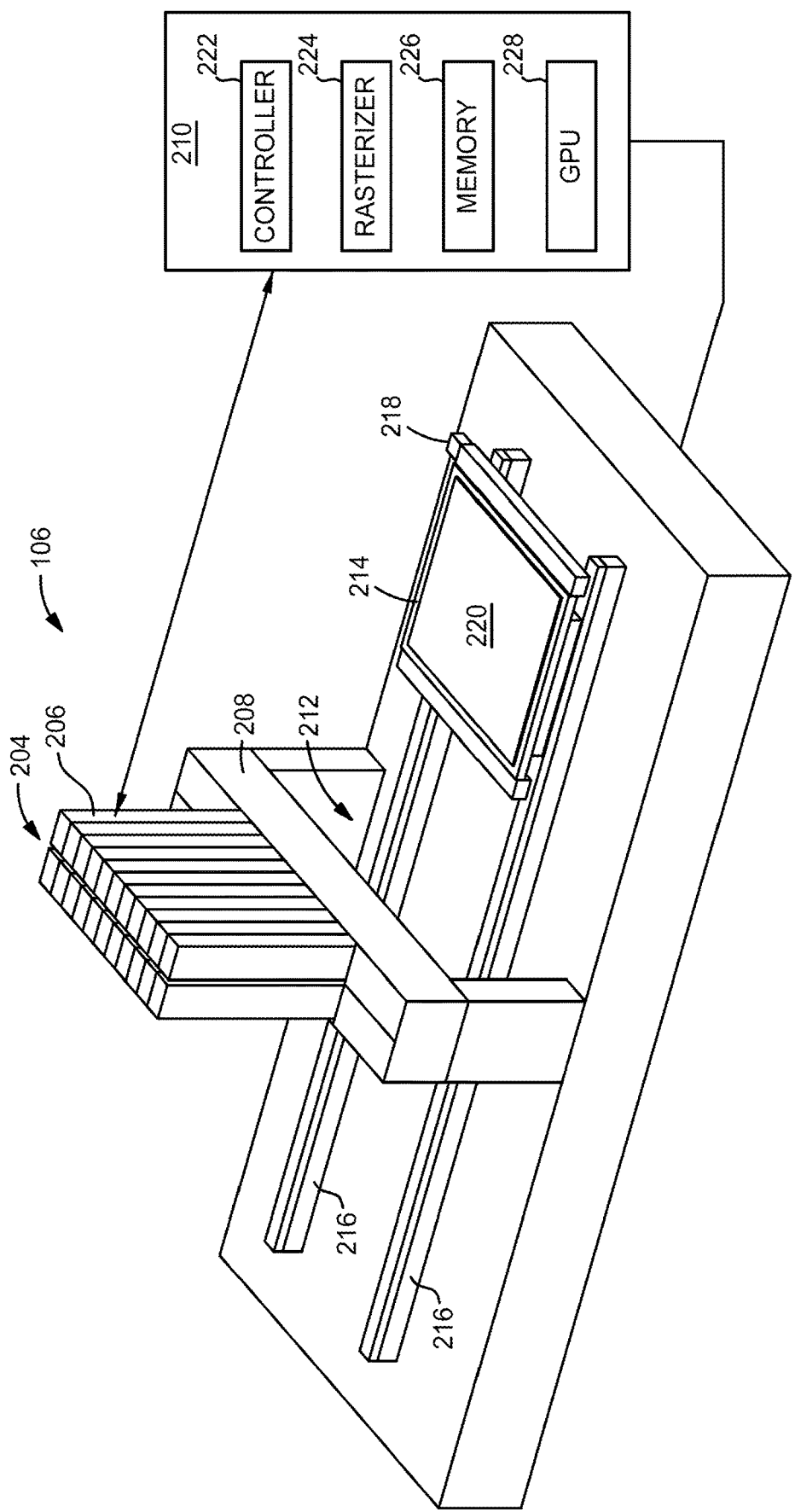
FIG. 2 is a perspective view of a maskless lithography device according to embodiments.

FIG. 2 is a perspective view of a maskless lithography device 106, such as a digital lithography system, that may benefit from embodiments described herein. The maskless lithography device 106 includes a stage 214 and a processing unit 204. The stage 214 is supported by a pair of tracks 216. A substrate 220 is supported by the stage 214. The stage 214 is operable to move along the pair of tracks 216. An encoder 218 is coupled to the stage 214 in order to provide information of the location of the stage 214 to a lithography server 210. The lithography server 210 includes, but is not limited to a controller 222, a rasterizer 224, a memory 226, and a GPU 228.

The controller 222 is generally designed to facilitate the control and automation of the processing techniques described herein. The controller 222 may be coupled to or in communication with the processing unit 204, the stage 214, and the encoder 218. The processing unit 204 and the encoder 218 may provide information to the controller 222 regarding the substrate processing and the substrate aligning. For example, the processing unit 204 may provide information to the controller 222 to alert the controller 222 that substrate processing has been completed. The controller 222 facilitates the control and automation of a maskless lithography process based on the virtual mask file provided to the lithography server 210. The virtual mask file is created by the virtual mask device 102. The virtual mask file is provided to the lithography server 210 from the CIM system 110 via the communication links 101. The design file includes a mask pattern data.

The controller 222 retrieves and executes programing data stored in the memory 226 and coordinates operations of other system components. Similarly, the controller 222 stores and retrieves application data residing in the memory 226. The controller 222 may be one or more central processing units (CPUs). Alternatively, or additionally, the controller 222 may be one or more application specific software programs.

The memory 226 may store instructions and logic to be executed by the controller 222. Further, the memory 226 may be one or more of a random access memory (RAM) and a non-volatile memory (NVM). The NVM may be a hard disk, a network attached storage (NAS), and a removable storage device, among others.

The substrate 220 comprises any suitable material, for example, glass, which is used as part of a flat panel display. In other embodiments, which can be combined with other embodiments described herein, the substrate 220 is made of other materials capable of being used as a part of the flat panel display. Additionally, the substrate 220 could be a wafer used in advanced packaging (AP) or similar applications in semiconductor manufacturing. The substrate 220 has a film layer to be patterned formed thereon, such as by pattern etching thereof, and a photoresist formed on the film layer to be patterned, which is sensitive to electromagnetic radiation, for example UV or deep UV "light".

A positive photoresist includes portions of the photoresist, when exposed to radiation, are respectively soluble to a photoresist developer applied to the photoresist after the pattern is written into the photoresist using the electromagnetic radiation. A negative photoresist includes portions of the photoresist, when exposed to radiation, will be respectively insoluble to photoresist developer applied to the photoresist after the pattern is written into the photoresist using the electromagnetic radiation. The chemical composition of the photoresist determines whether the photoresist is a positive photoresist or negative photoresist. Examples of photoresists include, but are not limited to, at least one of diazonaphthoquinone, a phenol formaldehyde resin, poly (methyl methacrylate), poly(methyl glutarimide), and SU-8. After exposure of the photoresist to the electromagnetic radiation, the resist is developed to leave a patterned photoresist on the underlying film layer. Then, using the patterned photoresist, the underlying thin film is pattern etched through the openings in the photoresist to form a portion of the electronic circuitry of the display panel or advanced packaging wafer.

The processing unit 204 is supported by the support 208 such that the processing unit 204 straddles the pair of tracks 216. The support 208 provides an opening 212 for the pair of tracks 216 and the stage 214 to pass under the processing unit 204. The processing unit 204 is a pattern generator configured to receive the virtual mask file from the lithography server 210 and expose the photoresist in the maskless lithography process using one or more image projection systems 206 operable to project write beams of electromagnetic radiation to the substrate 220. The pattern generated by the processing unit 204 is projected by the image projection systems 206 to expose the photoresist of the substrate 220 to the mask pattern 300 that is written into the photoresist.

In one embodiment, which can be combined with other embodiments described herein, each image projection system 206 includes a spatial light modulator to modulate the incoming light to create the desired image. Each spatial light modulator includes a plurality of electrically addressable elements that may be controlled individually. Each electrically addressable element may be in an "ON" position or an "OFF" position based on the virtual mask file and an edited virtual mask file created through the method 500 described herein. When the light reaches the spatial light modulator, the electrically addressable elements that are in the "ON" position project a plurality of write beams to a projection lens (not shown). The projection lens then projects the write beams to the substrate 220. The electrically addressable elements include, but are not limited to, digital micromirrors, liquid crystal displays (LCDs), liquid crystal over silicon (LCoS) devices, ferroelectric liquid crystal on silicon (FLCoS) devices, microshutters, microLEDs, VCSELs, liquid crystal displays (LCDs), or any solid state emitter of electromagnetic radiation.

The rasterizer 224, in some embodiments comprises one or more rasterizer computation engines and in embodiments, one or more spatial light modulator (SLM) arrays. In alternate embodiments, SLM arrays may comprise one or more digital micro-mirror (DMD) devices, microLED, VCSEL, and/or LCD arrays, or other type of spatial light modulators. The rasterizer 224 may include a rasterizer computation engine which includes one or more field programmable gate arrays (FPGAs), graphics processing units (GPUs), a combination of FPGAs and GPUs, or other processing hard/firmware capable of converting data in an image format to a format understandable by a DMD.

The virtual mask file is stored in the lithography server 210 of the maskless lithography device 106. The virtual mask file includes the mask pattern 300 which includes the design to be patterned on a substrate (e.g., the substrate 220). The virtual mask file includes the cells 304 (shown in FIG. 3) of the mask pattern 300. The cells 304 include a plurality of sub-cells 402 (shown in FIG. 4A). The plurality of sub-cells 402 form a polygon 404 (shown in FIG. 4A). In one embodiment, which can be combined with other embodiments described herein, the plurality of sub-cells 402 form one or more polygons 404. In another embodiment, which can be combined with other embodiments described herein, the cells 304 can be repeated. For example, the mask pattern 300 formed by the cells 304 can include multiples of the same cell 304 that repeat to form the mask pattern 300. The virtual mask file can be edited according to the replacement table. Replacement cells 406 (shown in FIGS. 4B-4D) can replace the cells 304 in FIG. 3 and FIG. 4A, according to the replacement table.

The virtual mask file is stored in the lithography server 210 of the maskless lithography device 106. In one embodiment, which can be combined with other embodiments described herein, the virtual mask file is stored on a disk in the lithography server 210. The lithography server 210 may be coupled with the maskless lithography device 106. Prior to a lot of substrates (e.g., a lot of the substrate 220) being patterned in the maskless lithography device 106, the virtual mask file is loaded into the memory 226. The maskless lithography device 106 patterns the substrate according to the virtual mask file stored in the memory 226.

The lot of substrates includes a lot ID number. Each lot ID number corresponds to a virtual mask file. Multiple virtual mask designs are stored in the maskless lithography device 106, each corresponding to a unique lot ID number. Thus, the lot ID number corresponds to the design to be patterned into the lot of substrates. In one embodiment, which can be combined with other embodiments described herein, the lot ID number is readable by the CIM system 110. The CIM system 110 communicates to the maskless lithography device 106 the lot ID related to the lot of substrates to be patterned. The virtual mask file corresponding to the lot ID number is loaded into the memory 226.

The lot of substrates includes a plate ID number. The plate ID number is a unique number for each lot of substrates. The plate ID number allows for efficient tracking of the lot of substrates and determination of the characteristics of the lot of substrates. For example, when defects are detected on the lot of substrates by the metrology tool 104, the plate ID number corresponding to the lot of substrates is readable by the CIM system 110. The CIM system communicates to the maskless lithography device 106 the plate ID number such that the lot of substrates is able to be identified.

The replacement table generated by the conversion server 108 is transferred through the CIM system 110. The CIM system 110 identifies the plate ID number associated with the replacement table and matches the replacement table with the lot of substrates having the plate ID number. The CIM system 110 is in communication with the lithography server 210 of the maskless lithography device 106 and transfers the replacement table to the lithography server 210. The replacement table includes instructions on edits to the virtual mask file loaded into the memory 226. The cells 304 (shown in FIG. 3) can be edited by replacing the cells 304 with the replacement cells 406 (shown in FIG. 4B-4D). The replacement table provides instructions to edit the polygon 404 of the cell 304 with the replacement cells 406. The replacement cells 406 replace the desired number of the cells 304 to create an edited virtual mask file. The edited virtual mask file is transferred to the processing unit 204. The processing unit 204 reads the edited virtual mask file and instructs the image projection systems 206 to pattern the edited design in the substrate 220.

By utilizing the replacement table to edit the mask pattern 300, the virtual mask file can be edited in the lithography server 210. Editing the virtual mask file in the lithography sever 210 enables an original version of the virtual mask file to be unchanged. Additionally, edits to the virtual mask file are applied late in the method 500 and impacts to manufacturing runtime are minimal.

Figure 3:
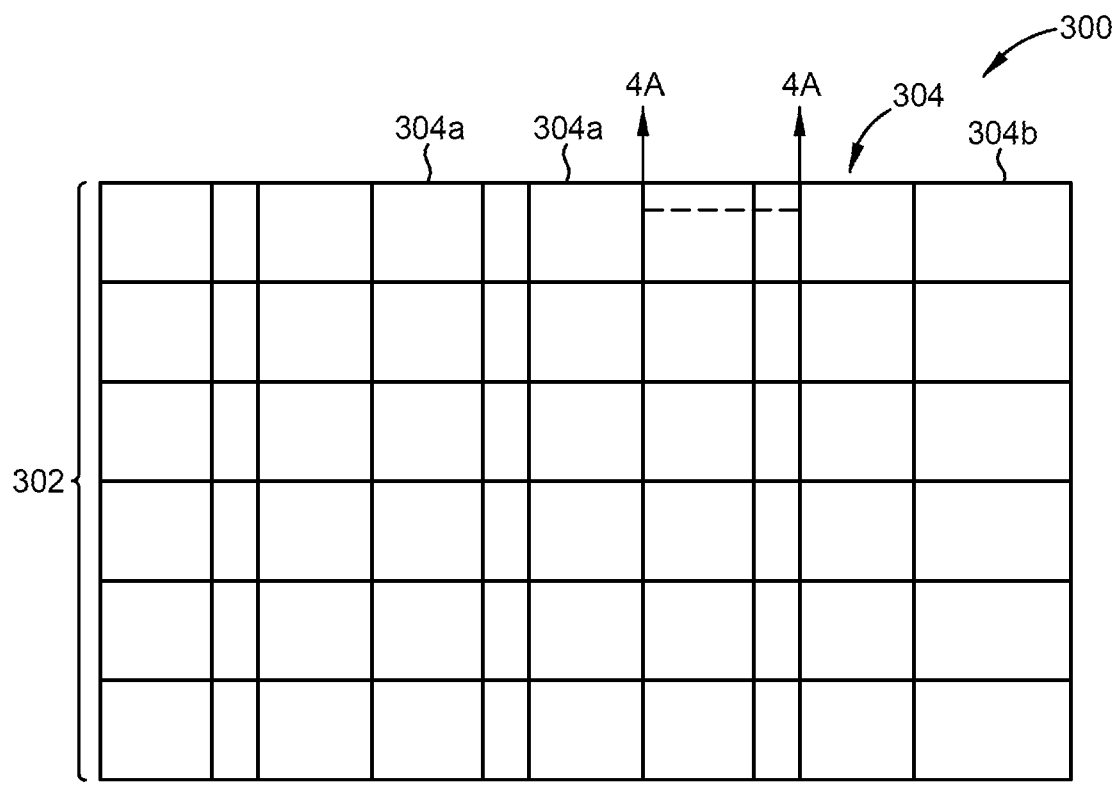
FIG. 3 is a schematic, top view of a mask pattern of a virtual mask file according to embodiments.

FIG. 3 is a schematic, top view of a mask pattern 300 of a virtual mask file, according to an embodiment. The virtual mask file includes the mask pattern 300. The mask pattern 300 may be organized within a hierarchy which may be referenced to make arrays 302. The arrays 302 include cells 304. In one embodiment, which can be combined with other embodiments described herein, a cell 304 of the cells 304 includes but is not limited to a pixel cell, a bezel cell, a contact cell, an indium tin oxide (ITO) cell, or a display cell. The cells 304 can be any combination of a pixel cell, a bezel cell, a contact cell, an indium tin oxide (ITO) cell, or a display cell. In another embodiment, which can be combined with other embodiments described herein, the cell 304 is a pixel cell. The pixel cell includes one or more sub-pixels. In yet another embodiment, which can be combined with other embodiments described herein, the cells 304 are overlapped (shown as overlapped cells 304a). In another embodiment, which can be combined with other embodiments described herein, the cells 304 are not overlapped (shown as adjoining cells 304b).

In one embodiment, which can be combined with other embodiments described herein, the cells 304 form circuitry. The circuity can include but is not limited to circuitry such as cell-type circuits, wire cell-type circuits, antennas, contact pads, driver circuits, and traces. In another embodiment, which can be combined with other embodiments described herein, the cells 304 may include multiple layers to be patterned. Each layer may represent different processing steps within a lithography process. Further, the cells 304 may span one or more layers within the design of the mask pattern 300.

The mask pattern 300 corresponds to the design to be patterned into the substrate 220. Referencing FIGS. 1 and 2, the mask pattern 300 included in the virtual design file, is stored in lithography server 210. When the CIM system 110 reads a lot ID number of the lot of substrates that corresponds to the virtual design file, the virtual design file including the mask pattern 300 is loaded to the memory 226 of the lithography server 210. Each cell 304 of the mask pattern 300 can be edited by the replacement table provided to the lithography server 210.

Figure 4A:
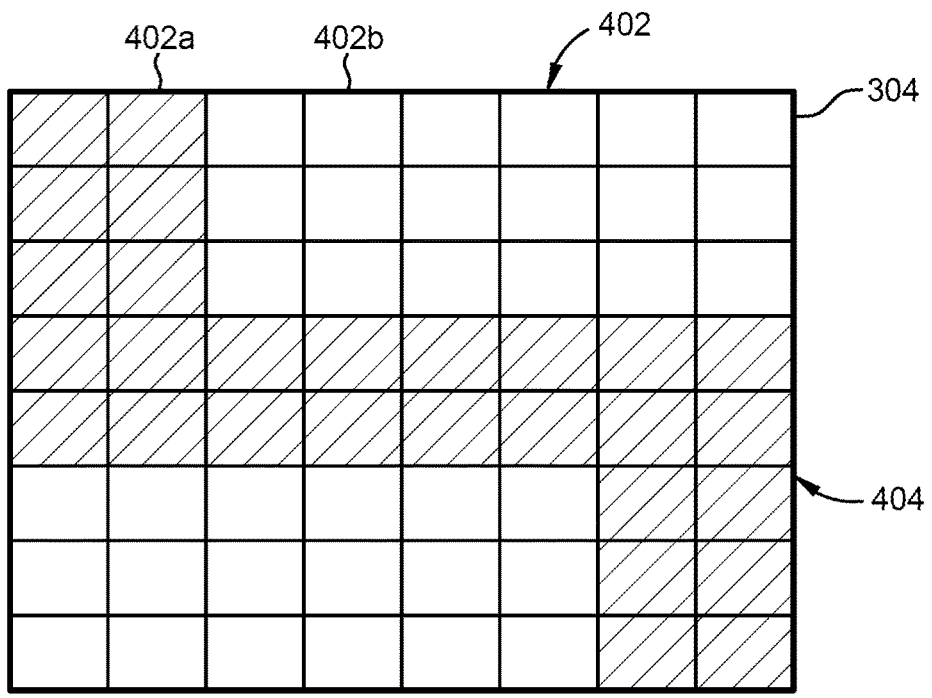
FIG. 4A is a schematic, top-view of a cell according to embodiments.

FIGS. 4A is a schematic top view of a cell 304. The cell 304 includes a plurality of sub-cells 402. In one embodiment, which can be combined with other embodiments described herein, the cell 304 is a pixel cell, a bezel cell, a contact cell, an ITO cell, or a display cell. Each sub-cell 402 of the plurality of sub-cells 402 can be an active sub-cell 402a or an inactive sub-cell 402b. FIG. 4A shows the cell 304 with the plurality of sub-cells 402 forming a polygon 404. In one embodiment, which can be combined with other embodiments described herein, the polygon 404 can span one or more layers of the cell 304. The polygon 404 to be patterned onto the substrate 220 can be edited by the replacement table. For example, if a defect is detected by the metrology tool 104 on the substrate 220, the mask pattern 300 can be edited to account for the defects by inserting replacement cells 406.

Figure 4B:
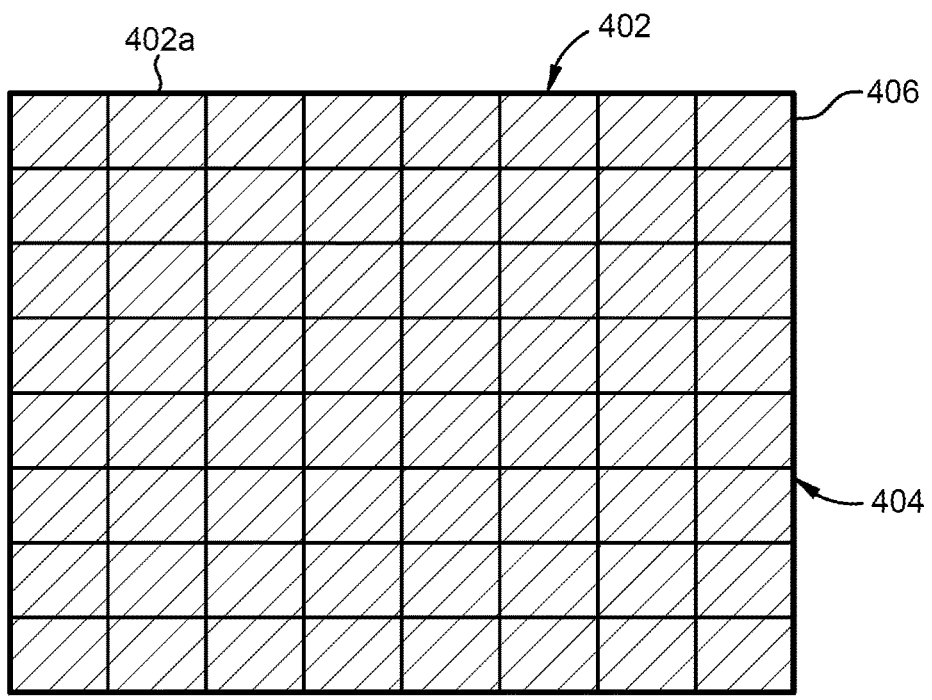
FIGS. 4B-4D are schematic, top views of a replacement cell according to embodiments.
Figure 4C:
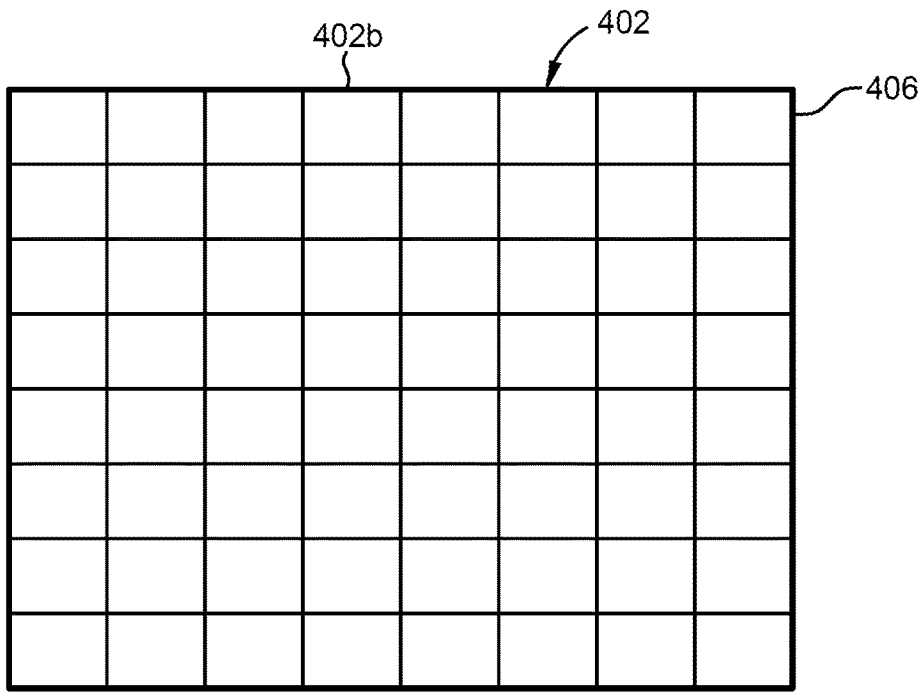
Figure 4D:
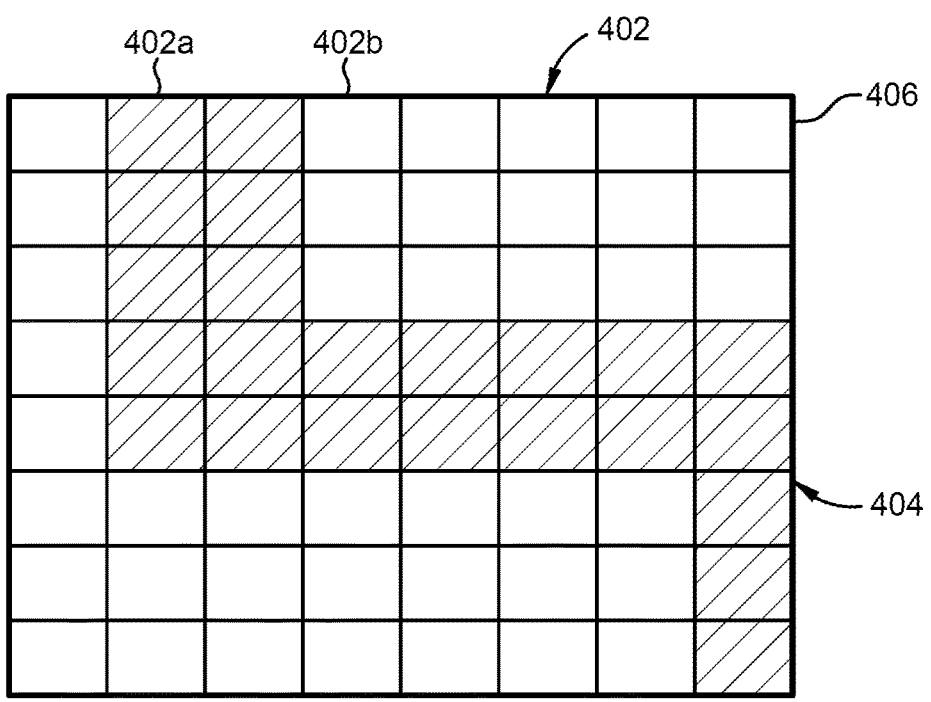

FIGS. 4B-4D are schematic, top views of a replacement cell 406. The replacement cells 406, shown in FIGS. 4C-4D can replace the cell 304. For example, the cell 304 to be patterned on the substrate 220 at a determined location can be edited by the replacement table, such as by replacing the cell 304 with one of the replacement cells 406. The replacement cell 406 includes the plurality of sub-cells 402. Each sub-cell 402 of the plurality of sub-cells 402 can be an active sub-cell 402a or an inactive sub-cell 402b. The plurality of sub-cells 402 can be patterned to edit the polygon 404 as desired. When the cell 304 is replaced with the replacement cell 406, an edited virtual mask file is created including the replacement cell 406.

The editing of the cells 304 of the mask pattern 300 takes place locally in the lithography server 210. In one embodiment, which can be combined with other embodiments described herein, the cell 304 of the mask pattern 300 with the polygon 404 can be replaced by the replacement cell 406. The replacement cell 406 will edit the polygon 404 as desired FIG. 4B illustrates the replacement cell 406 with the plurality of sub-cells 402 forming the polygon 404. The polygon 404 of FIG. 4A is edited according to the replacement table to form the polygon of FIG. 4B. In one embodiment, which can be combined with other embodiments described herein, the inactive sub-cells 402b can be patterned to be active sub-cells 402a. Therefore, the polygon 404 can be edited by activating the desired sub-cells 402.

FIG. 4C illustrates the replacement cell 406 with the plurality of sub-cells 402. The polygon 404 of FIG. 4A is edited according to the replacement table to remove the polygon 404. In one embodiment, which can be combined with other embodiments described herein, the active sub-cells 402a can be patterned to be inactive sub-cells 402b. For example, as shown in FIG. 4C, the polygon 404 is removed by adding the inactive sub-cells 402b to the replacement cell 406.

FIG. 4D illustrates the replacement cell 406 with the plurality of sub-cells 402 forming the polygon 404. The polygon 404 of FIG. 4A is edited according to the replacement table to form the polygon 404 of FIG. 4D. In one embodiment, which can be combined with other embodiments described herein, the active sub-cells 402a can be shifted. In one embodiment, which can be included in other embodiments described herein, as shown in FIG. 4D, the replacement cell 406 includes the polygon 404 shifted in the x-direction relative to the cell 304. In another embodiment, which can be combined with other embodiments described herein, the replacement cell 406 has been edited to shift the polygon 404 in the y-direction relative to the cell 304. In yet another embodiment, which can be combined with other embodiments described herein, the replacement cell 406 has been edited to shift the polygon 404 in the x-direction and the y-direction relative to the cell 304.

In one embodiment, which can be combined with other embodiments described herein, the mask pattern 300 can be adjusted to account for changes with the lot of substrates such as substrate rotation, substrate expansion, substrate contraction, and other geometric shifts.

Figure 5:
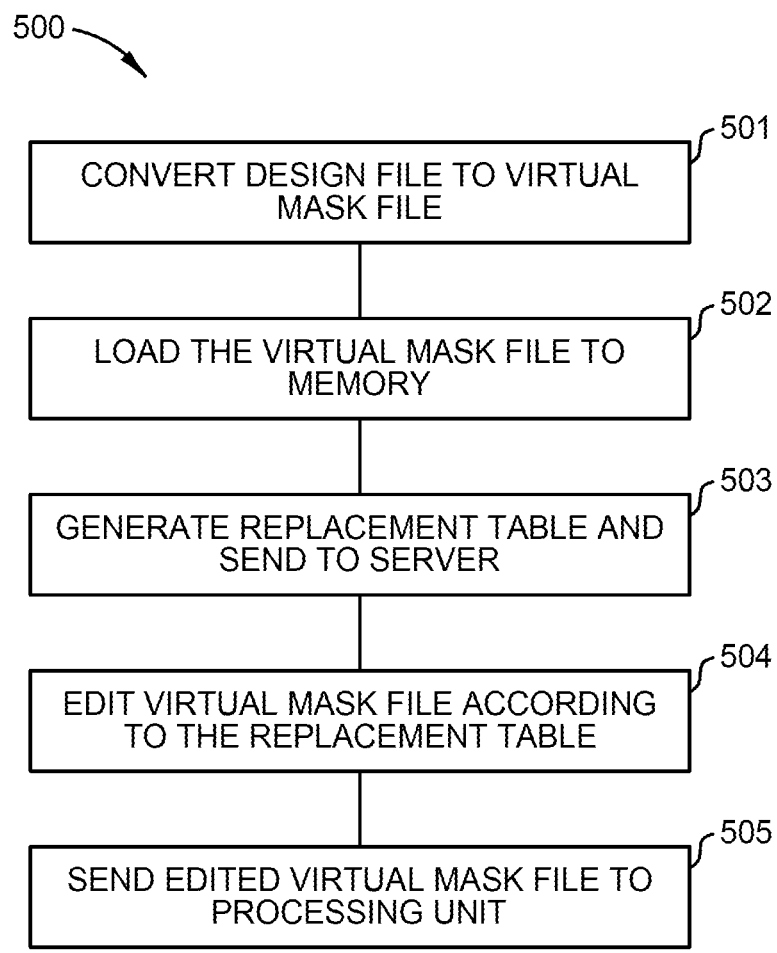
FIG. 5 is a flow diagram of a method for editing the virtual mask file according to embodiments.

FIG. 5 is a flow diagram of a method 500 for editing the virtual mask file. At operation 501, a design file is converted to a virtual mask file. The design file is converted to the virtual mask file in the virtual mask device 102. The virtual mask file is stored in the maskless lithography device 106. For example, the virtual mask file is stored in a disk of the maskless lithography device 106. There are multiple virtual mask files stored in the maskless lithography device 106, each corresponding to different design files.

At operation 502, the virtual mask file is loaded to the memory 226 of a lithography server 210. In one embodiment, which can be combined with other embodiments described herein, a CIM system 110 reads a lot ID number corresponding to a lot of substrates to be patterned. The lot ID number includes information on which virtual mask file of the multiple virtual mask files is needed for the patterning process. The CIM system 110 communicates to the maskless lithography device 106 the lot ID number of the lot of substrates to be patterned such that the corresponding virtual mask file can be loaded to the memory 226.

At operation 503, a replacement table is generated and is sent to the lithography server 210. The metrology tool 104 detects defects in the lot of substrates. A defect list is created and sent to a conversion sever 108. The conversion server 108 converts the defect list into the replacement table. The replacement table accounts for the defects in the lot of substrates and creates the replacement table to improve the quality of the lot of substrates. The replacement table provides instructions to replace the cell 304 with the replacement cell 406. Each replacement table is matched with a plate ID number of the lot of substrates. The CIM system 110 reads the plate ID number of the lot of substrates. Therefore, the replacement table corresponding to the lot of substrates can be sent to the lithography server 210.

At operation 504, the virtual mask file is edited according to the replacement table. The mask pattern 300 including the polygon 404 is edited by replacing the cell 304 with the replacement cell 406. The replacement cell 406, based on instructions from the replacement table, activates, deactivates, shifts, or replaces the sub-cells 403 of the replacement cell 406. The replacement cell 406 then can replace the cell 304 in the mask pattern 300 to form an edited virtual mask file. The original version of the virtual mask file is preserved in the maskless lithography device 106. In one embodiment, which can be combined with other embodiments described herein, the edited virtual mask file is sent to a rasterizer 224 in the lithography server 210 to be rasterized.

The editing of the virtual mask file in the lithography server 210 allows for the cells 304 to be edited without altering the original version of the virtual mask file. The editing of the cells 304 takes place late in the process and thus there is marginal runtime impact. Additionally, the editing of the virtual mask file will lead to higher quality patterning of the substrates, as the cells 304 can be edited to account for the defects detected in the substrate 220 or the underlying layer. The method 500 makes it feasible to account for different defects in each substrate efficiently.

At operation 505, the edited virtual mask file is sent to a processing unit 204 of the maskless lithography device 106. The processing unit 204 utilizes the edited virtual mask file to pattern the lot of substrates.

In summation, a system, software, and a method of using the system to edit a design to be printed by a lithography system are provided. The system and methods utilize a replacement table that edits a virtual mask file. The virtual mask file includes a mask pattern of the design to be printed on a lot of substrates by the maskless lithography device. The replacement table is provided by the metrology tool and the server to the lithography server of the maskless lithography device. The replacement table includes instructions to replace the cells of the mask pattern of the virtual mask file. The replacement table accounts for the defects on the lot of substrates detected by the metrology tool. The cells are replaced with replacement cells to create an edited virtual mask file. Creating the edited virtual mask device in the lithography server will lead to an increase in quality of the substrates. Additionally, editing the virtual mask file late in the method has a marginal runtime impact.

While the foregoing is directed to examples of the present disclosure, other and further examples of the disclosure may be devised without departing from the basic scope thereof, and the scope thereof is determined by the claims that follow.

The invention claimed is:

1. A server for use in performing digital lithography, the server comprising:
   a memory comprising a virtual mask file, the virtual mask file including cells, the cells including sub-cells that form one or more polygons; and
   a controller coupled to the memory, the controller configured to:
      receive a replacement table, the replacement table including instructions to replace the cells of the virtual mask file;
      replace the cells with replacement cells according to the replacement table to create an edited virtual mask file; and
   wherein the server is operable to be used in performing digital lithography on a substrate based on the edited virtual mask file.

2. The server of claim 1, wherein the server is operable to activate or deactivate the sub-cells based on the replacement table.

3. The server of claim 1, wherein the server is operable to shift the sub-cells based on the replacement table.

4. The server of claim 1, wherein the edited virtual mask file includes at least one of the replacement cells.

5. The server of claim 1, wherein the virtual mask file includes a mask pattern.

6. The server of claim 1, wherein the server further includes a rasterizer and a GPU.

7. The server of claim 1, wherein the replacement table is formed from a defect list provided from a metrology tool coupled to the server.

8. The server of claim 1, wherein the virtual mask file includes layers of the cells.

9. The server of claim 1, wherein the virtual mask file includes arrays of the cells, the cells including a pixel cell, a bezel cell, a contact cell, an indium tin oxide (ITO) cell, or a display cell.

10. A method, comprising:
    loading a virtual mask file into a memory of a server of a maskless lithography device, the virtual mask file including cells, the cells including sub-cells that form one or more polygons;
    sending a replacement table to the server, the replacement table including instructions to replace the cells of the virtual mask file; and
    replacing the cells with replacement cells according to the replacement table to create an edited virtual mask file, the edited virtual mask file created in the server of the maskless lithography device.

11. The method of claim 10, wherein the server is operable to activate or deactivate the sub-cells based on the replacement table.

12. The method of claim 10, wherein the server is operable to shift the sub-cells based on the replacement table.

13. The method of claim 10, wherein the edited virtual mask file includes at least one of the replacement cells.

14. The method of claim 10, wherein the virtual mask file includes a mask pattern.

15. The method of claim 10, wherein the server further includes a rasterizer and a GPU.

16. The method of claim 10, wherein the cells of the virtual mask file are overlapped.

17. The method of claim 10, wherein the virtual mask file includes layers of the cells.

18. The method of claim 10, wherein the virtual mask file includes arrays of the cells, the cells including a pixel cell, a bezel cell, a contact cell, an indium tin oxide (ITO) cell, or a display cell.

19. The method of claim 10, further comprising sending the edited virtual mask file to a processing unit of the maskless lithography device.

20. A non-transitory computer-readable medium storing instructions that, when executed by a processor, cause a computer system to perform the steps of:
    loading a virtual mask file into a memory of a server of a maskless lithography device, the virtual mask file including cells, the cells including sub-cells that form one or more polygons;
    sending a replacement table to the server, the replacement table including instructions to replace the cells of the virtual mask file; and
    replacing the cells with replacement cells according to the replacement table to create an edited virtual mask file, the edited virtual mask file created in the server of the maskless lithography device.

* * * * *